United States Patent
Guo et al.

(10) Patent No.: US 7,627,155 B2
(45) Date of Patent: Dec. 1, 2009

(54) FAST GEOMETRIC FLOWS BASED WHITE MATTER FIBER TRACT SEGMENTATION IN DT-MRI

(75) Inventors: Weihong Guo, Gainesville, FL (US); Zhizhou Wang, Plainsboro, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 687 days.

(21) Appl. No.: 11/489,103

(22) Filed: Jul. 19, 2006

(65) Prior Publication Data

US 2007/0092120 A1    Apr. 26, 2007

Related U.S. Application Data

(60) Provisional application No. 60/730,473, filed on Oct. 26, 2005.

(51) Int. Cl.
*G06K 9/00* (2006.01)
*G01V 3/00* (2006.01)

(52) U.S. Cl. .......................... 382/128; 324/309

(58) Field of Classification Search ............... 382/128, 382/129, 130, 131, 132, 133, 134; 600/407, 600/410, 411, 425; 128/920, 922; 324/307, 324/309
See application file for complete search history.

(56) References Cited

U.S. PATENT DOCUMENTS 5,969,524 A * 10/1999 Pierpaoli et al. ............ 324/307
7,034,531 B1 * 4/2006 Tuch et al. .................. 324/309

OTHER PUBLICATIONS

Jonasson, L., et al., "White Matter Fiber Tract Segmentation in DT-MRI Using Geometric Flows",*Medical Image Analysis*, vol. 9, pp. 223-226 (2005).
Lazar, M., et al., "White Matter Tractograhy Using Diffusion Tensor Deflection", *Human Brain Mapping*, 18:306-321(2003).

* cited by examiner

*Primary Examiner*—Abolfazl Tabatabai
(74) *Attorney, Agent, or Firm*—Donald B. Paschburg

(57) ABSTRACT

Segmentation of White Matter Fiber Tract in DT-MRI images is achieved by using level sets methods including a method which will increase the speed and quality of the surface evolvement. A method system representing a measure of coincidence of the tensor field with the normal of the surface front to increase the speed and quality of a level set method in DT-MRI is disclosed.

12 Claims, 7 Drawing Sheets

301  303  302

FAST GEOMETRIC FLOWS BASED WHITE MATTER FIBER TRACT SEGMENTATION IN DT-MRI

CROSS-REFERENCE TO RELATED APPLICATIONS

This application claims the benefit of U.S. Provisional Application No. 60/730,473 filed Oct. 26, 2005, which is incorporated herein by reference.

BACKGROUND OF THE INVENTION

The present invention relates to image segmentation of major white matter bundles in the human brain using diffusion tensor imaging (DTI) datasets.

Diffusion tensor imaging (DTI) has become an important diagnostic imaging technique in medical applications and can be used in neuron navigation and surgery. The Diffusion Tensor measured in nerve fibers may be highly anisotropic and provide a way to identify fiber tracts. Region based segmentation methods using DTI may not work for the whole tract. DTI methods applying evolving surfaces (level set methods) can improve the segmentation of white matter fiber tract. Current level set methods can be relatively slow and not completely accurate in segmenting white matter fiber tracts.

Accordingly, new and improved geometric flow based methods for segmentation of white matter fiber tracts in DT-MRI are required.

SUMMARY OF THE INVENTION

One aspect of the present invention presents a novel method and system for segmentation of White Matter Fiber Tract in MRI imaging.

It is another aspect of the present invention to provide a method to determine the surface evolution velocity as a function of the similarity measure NTSP and to increase the surface evolution velocity at locations where the normal direction of the evolving surface is more coincident with the tensor field of the image.

It is a further aspect of the present invention to provide an expression for the surface evolution velocity as F=mean (NTSP($D_i$, $D_{i+1}$), NTSP($D_i$, $D_{i+2}$))+βCOIN.

It is another aspect of the present invention to provide a measure of coincidence COIN.

It is a further aspect of the present invention to provide an expression for the measure of coincidence as $$COIN_3 = (FA) * N \cdot \frac{Di * N}{\max(\lambda_1, \lambda_2, \lambda_3)}.$$

A system that can process a DT-MRI image that includes White Matter Fiber Tract, comprising a processor and application software operable on the processor is also provided in accordance with one aspect of the present invention. The application software can perform all of the methods described herein.

DESCRIPTION OF A PREFERRED EMBODIMENT

Geometric flows, especially curvature shortening flows are becoming more and more important regularization tools in computer vision. A curvature flow is a curve or surface that evolves at each point along its normal with a velocity depending on the curvature at that point. A geometric flow is a curve or surface that evolves with a velocity depending on external properties determined by the image features.

A general flow for a 3D closed surface can be described as $$\frac{\partial S}{\partial t} = (F + H)N \qquad (1)$$

where F is an image based speed function, H is an intrinsic speed depending on the curvature of the surface S, N is the normal of the surface and t is time.

To solve this time dependent partial differential equation, the level set method introduced by Osher and Sethian (1988) can be applied, where the evolving surface is considered as 0 level set of a function of one dimension higher (φ). By doing this, a numerically stable algorithm that easily handles topology changes of the evolving surface is obtained. Equation (1) becomes $$\frac{\partial \phi}{\partial t} = (F + H)|\nabla_\phi| \qquad (2)$$

It is one aspect of the present invention to design an efficient and senseful external force or speed function F.

Figure 1:
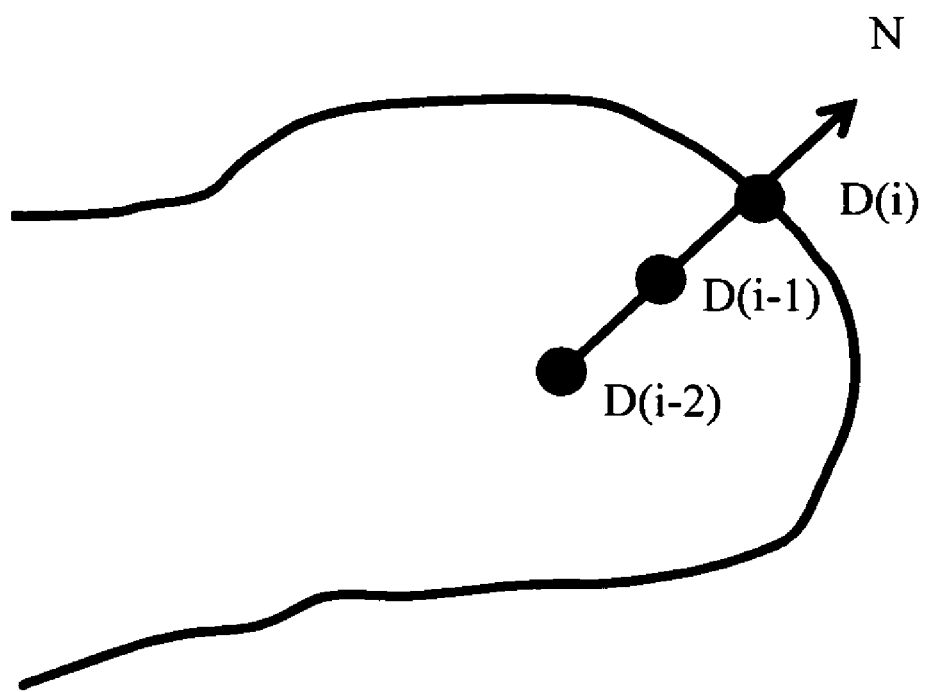
FIG. 1 illustrates the choice of adjacent voxels.

L. Jonasson, X. Bresson, P Hagmann, O. Cuisenaire, R. Meuli, and J. Thiran, "White matter fiber trace segmentation in DT-MRI using geometric flows," *Medical Image Analysis.*, vol. 9, pp. 223-236, 2005, introduced a similarity based front propagation process. They defined $$F=\text{mean}(\text{NTSP}(D_i,D_{i-1}),\text{NTSP}(D_i,D_{i-2})), \qquad (3)$$

wherein $D_i$ is the diffusion tensor in the current voxel and $D_{i-p}$ is the diffusion tensor in grid found by following the normal to the surface p voxels backwards from the original voxel i, see FIG. 1, and then selecting the nearest neighbor. NTSP($D_i$, $D_{i-1}$) is the normalized tensor scalar product defined as $$NTSP(D_i, D_{i-1}) = \frac{D_i : D_{i-1}}{\text{Trace}(D_i)\text{Trace}(D_{i-1})}, \qquad (4)$$

with $D_i:D_{i-1}=\text{Trace}(D_iD_{i-1})$, NTSP($D_i$, $D_{i-2}$) is defined similarly. One of the most common measures of similarity between two tensors is the tensor scalar product (TSP) and is a measure of the overlap between two tensors. The TSP is often normalized to avoid influence by the relative size of the two tensors, as described in the earlier cited article by Lisa Jonasson et al. The fundamental assumption of the segmentation technique in the cited article by Lisa Jonasson et al. is that adjacent voxels in a tract have similar diffusion properties. The present model still applies this assumption, but with the purpose to obtain a faster geometric flow.

Figure 2:
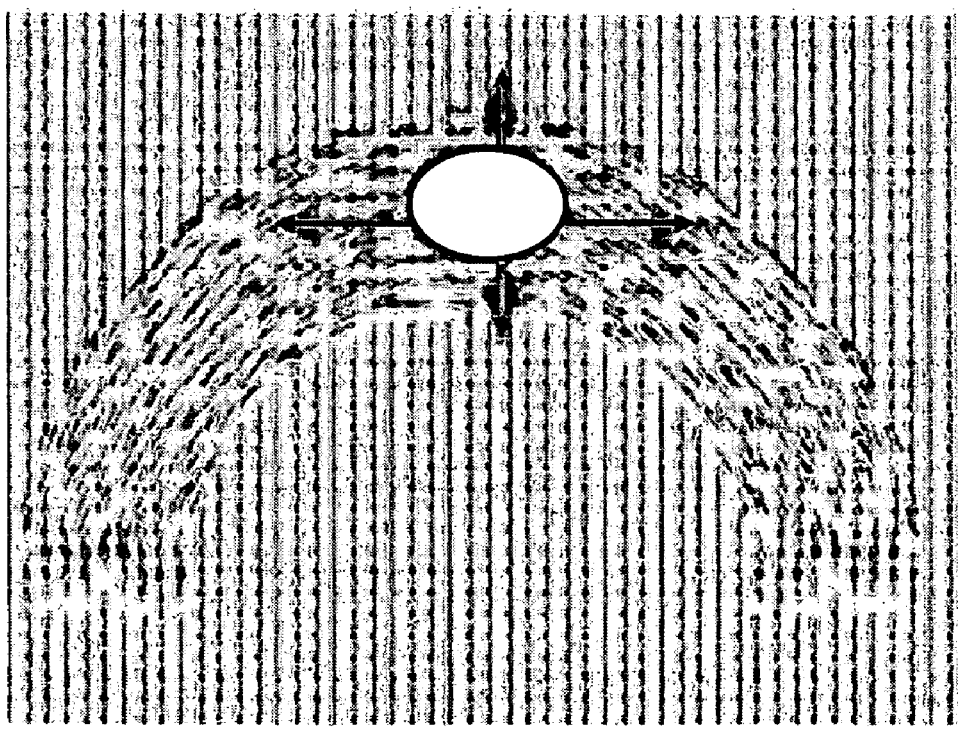
FIG. 2 shows an evolving curve in a 2D tensor field.

FIG. 2 shows an example of a 2D tensor field to demonstrate the background of the presented model. In FIG. 2 the black ellipse depicts the evolving curve, the horizontal black arrows and the vertical grey arrows show normal directions at corresponding locations. Intuitively, evolution speed along the horizontal arrows should be larger than that along the vertical arrows.

This is because the horizontal arrows point to the direction of the fiber tracts while the vertical arrows are not. Mathematically, evolution should be faster at locations where the normal direction is more coincident with the tensor field. FIG. 1. shows the choice of adjacent voxels with respect to the normal of the surface, as shown in [1] L. Jonasson, X. Bresson, P Hagmann, O. Cuisenaire, R. Meuli, and J. Thiran, "White matter fiber trace segmentation in DT-MRI using geometric flows," Medical Image Analysis., vol. 9, pp. 223-236, 2005. FIG. 2 shows the evolving curve (black ellipse) superimposed inside a semi-circle shaped 2D tensor field.

As an aspect of the present invention the evolution force can be described as:

$$F = \text{mean}(\text{NTSP}(D_i, D_{i+1}), \text{NTSP}(D_i, D_{i+2})) + \beta COIN, \quad (5)$$

where COIN is a measure of coincidence of the normal direction and the tensor field and $\beta$ is a constant.

Three candidates have been considered for COIN. A first candidate is $$COIN_1 = N \cdot PE \quad (6)$$

with PE the principal eigenvector of the current diffusion tensor $D_i$, and N the normal direction.

The other candidate is:

$$COIN_2 = (FA) * N \cdot \frac{D_i * N}{|D_i * N|} \quad (7)$$

with FA the fractional anisotropy value of tensor $D_i$.

Another embodiment of COIN is:

$$COIN_3 = (FA) * N \cdot \frac{Di * N}{\max(\lambda_1, \lambda_2, \lambda_3)} \quad (7a)$$

where $\lambda_1, \lambda_2, \lambda_3$ are the eigen values of Di*N.

The definition of $COIN_1$ is quite intuitive: if the normal direction is coincident with the principle direction of tensor, the evolution speed is higher. FA is used by Mariana Lazar et al. in [2] M. Lazar, D. Weinstein, and J. Tsuruda et al, "White matter tractography using diffusion tensor deflection," Human Brain Mapping, vol. 18, pp. 306-321, 2003. Segmentation using $COIN_3$ is less sensitive to image noise and experimental results show that it is more efficient than $COIN_1$. In equation (5), the similarity is defined using $D_{i+1}, D_{i+2}$ which are neighbors of $D_i$ along the positive normal direction instead of negative normal direction. This is done to avoid overshooting.

F is then used to evolve the surface, as explained in the Jonasson article. This results in a faster segmentation.

Certain termination criteria are used to determine the boundaries of tracts. It is preferred to use two criteria. Evolution of the curve/surface is terminated at locations where the similarity measure NTSP is less than a threshold or where the gradient of the similarity NTSP is less than a threshold. These two criteria combined together can accurately catch the boundary for segmentation purposes. In the article [1] L. Jonasson, X. Bresson, P Hagmann, O. Cuisenaire, R. Meuli, and J. Thiran, "White matter fiber trace segmentation in DT-MRI using geometric flows," Medical Image Analysis., vol. 9, pp. 223-236, 2005, only the first criterion is used. This does not work well for segmentation of vector/tensor field composed of homogeneous regions. In the present case that is used as an illustrative example, the similarity map of the vector/tensor field is a piecewise constant function. Locations with a high gradient of similarity are on the boundary of the segmentation. Using a threshold of similarity is not able to identify this boundary and consequently would not be sufficient as a segmentation criterion.

Figure 3:
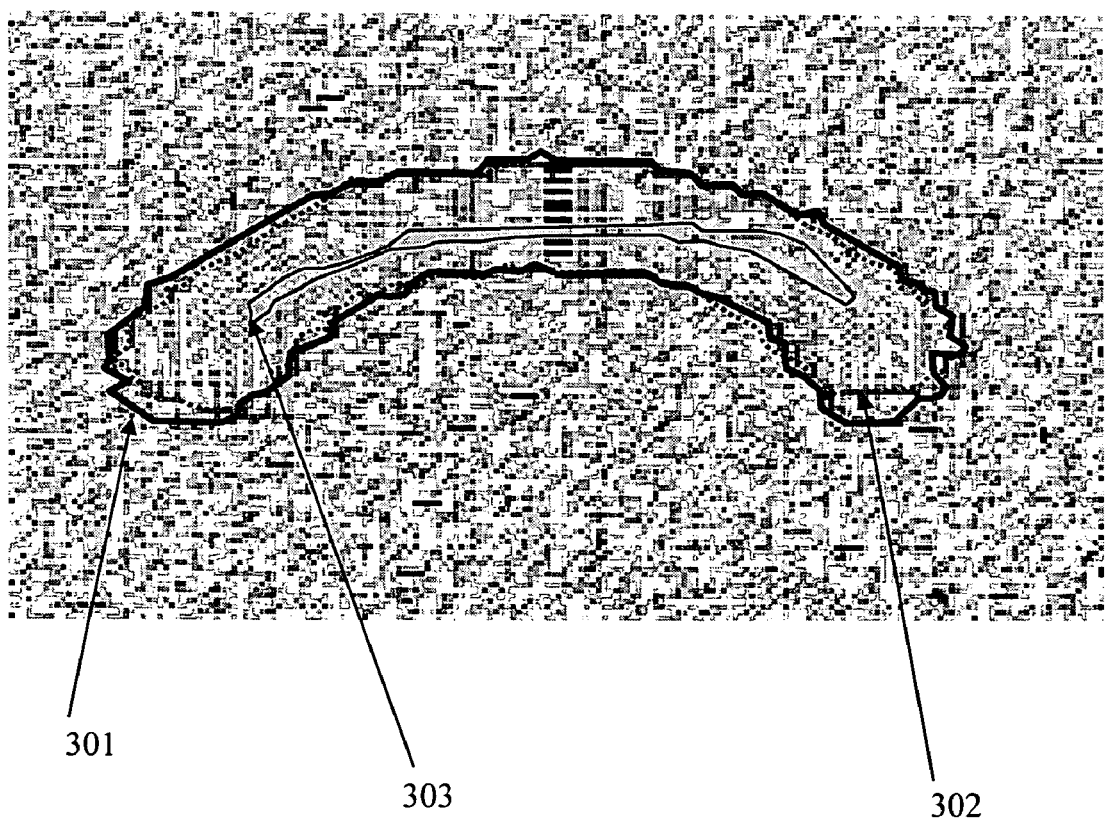
FIG. 3 shows a segmentation within a tensor field.

Synthetic tensor fields have been created to test and compare segmentation methods. FIG. 3 compares the segmentation quality of the method presented as an aspect of the present invention and the method applied in article [1]. L. Jonasson, X. Bresson, P Hagmann, O. Cuisenaire, R. Meuli, and J. Thiran, "White matter fiber trace segmentation in DT-MRI using geometric flows," Medical Image Analysis., vol. 9, pp. 223-236, 2005. The method as described in this cited article has been applied to the recreated synthetic tensor fields. The results as depicted in FIG. 3 show that the method presented as one aspect of the present invention is more accurate. Contour 301 in FIG. 3 shows the segmentation using the method of the present invention with the coincidence term $\beta=10$, applying 25 iterations in 53.45 seconds in Matlab. Contour 302 shows the segmentation without applying a coincidence term ($\beta=0$), with 50 iterations in Matlab for 105.55 seconds. Curve 303 is the initial contour. Consequently the method that is an aspect of the present invention is also faster than the method not using a coincidence term.

Figure 4:
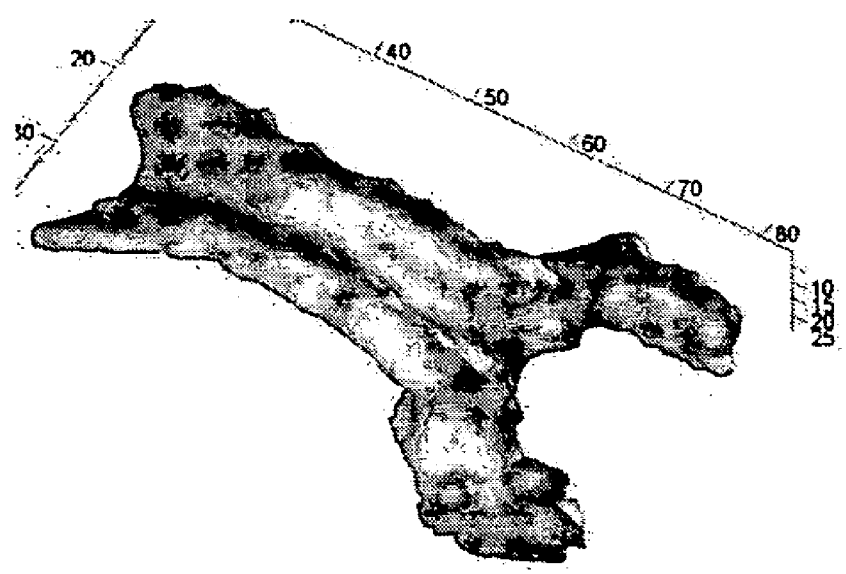
FIGS. 4 to 6 show segmentations of the corpus callosum.
Figure 5:
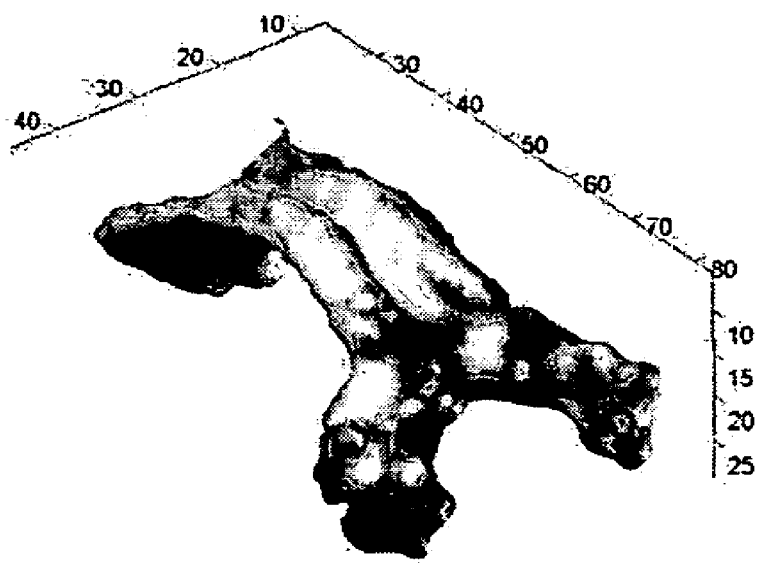
Figure 6:
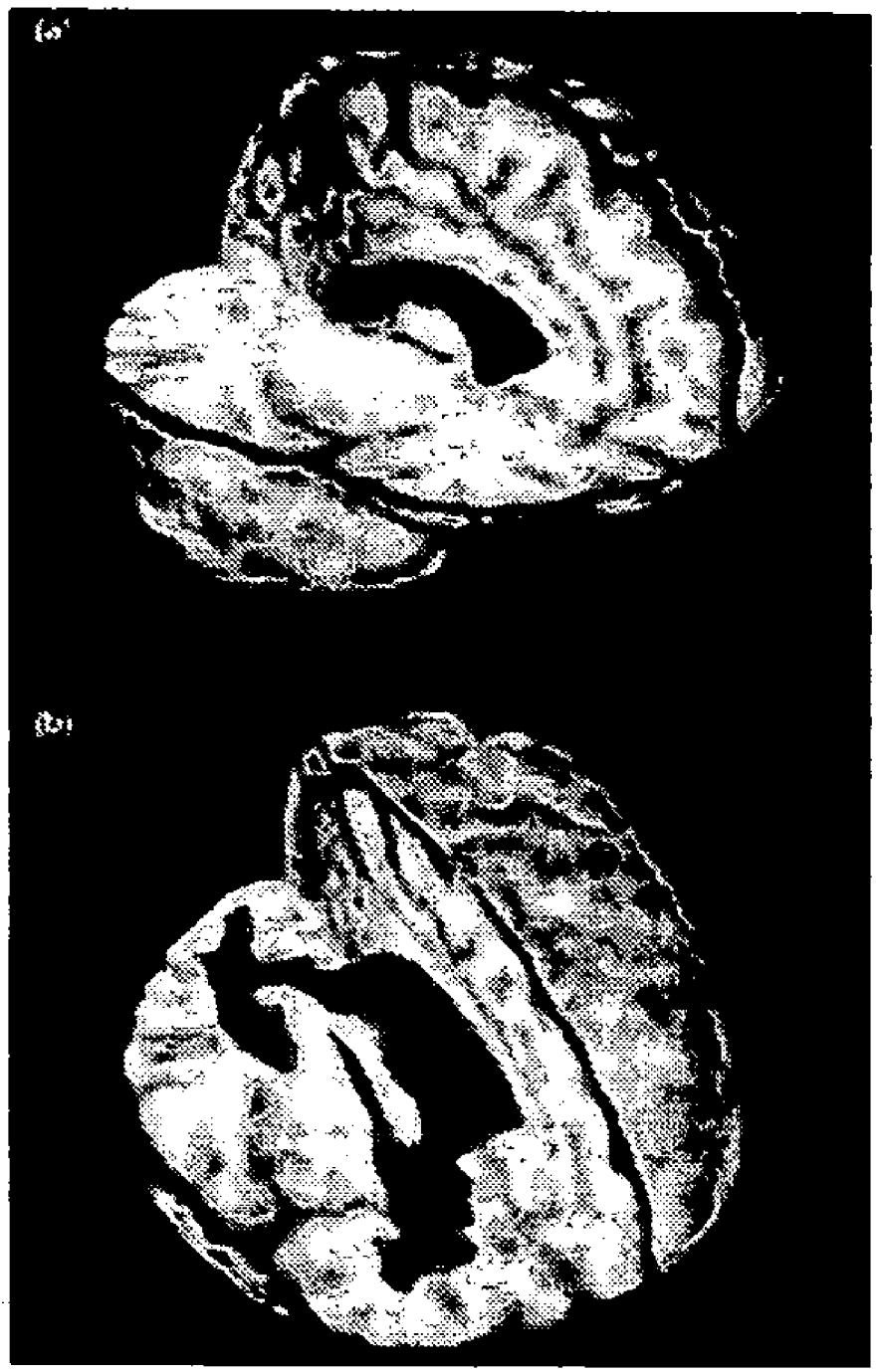
Figure 7:
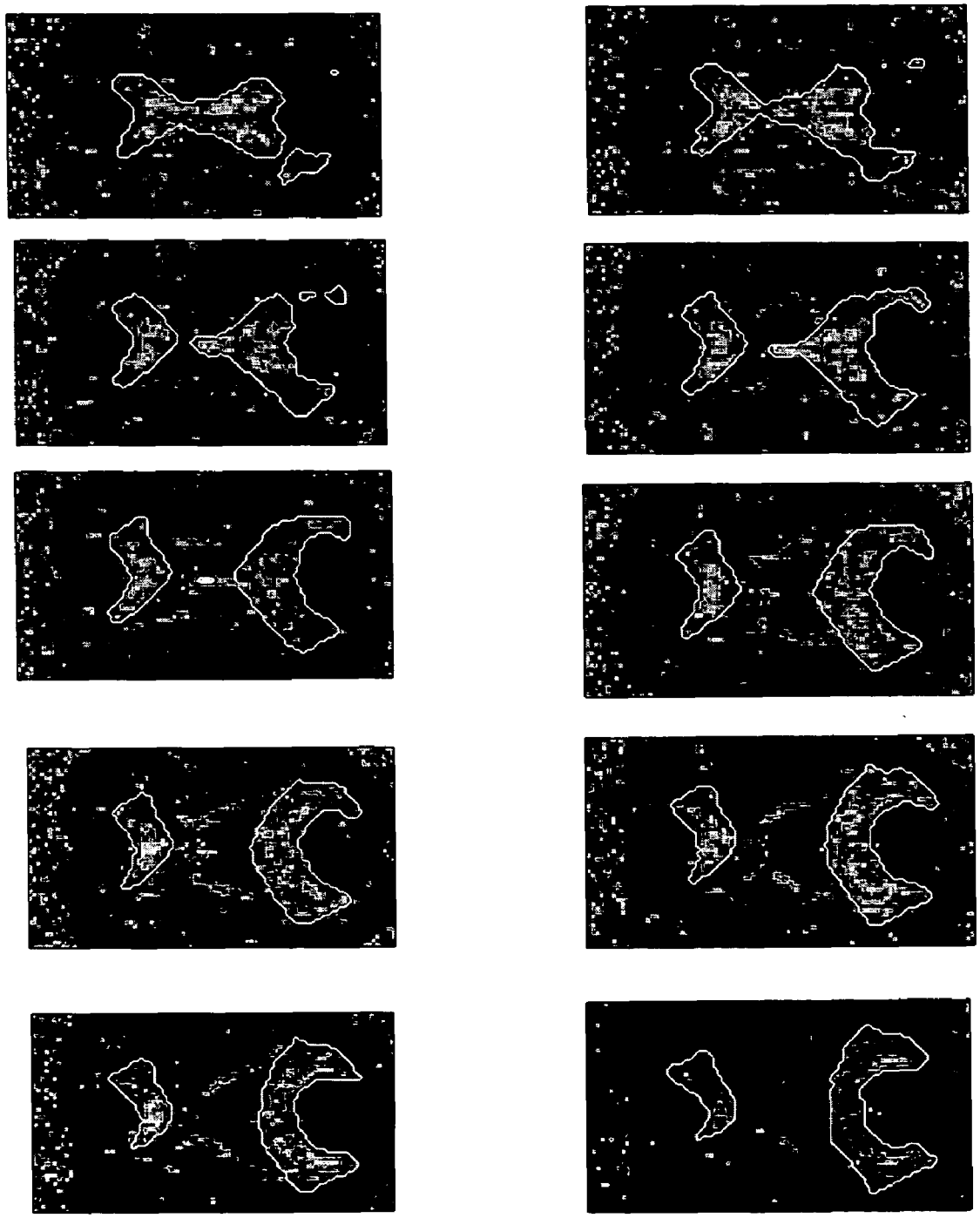
FIG. 7 shows sectional segmentation contours of corpus callosum.

Human brain images have been used to validate the presented approach. FIG. 4 and FIG. 5 show segmentation of corpus callosum using different views obtained using the proposed model. For comparison, FIG. 6 shows results obtained using the model applied in [1]. L. Jonasson, X. Bresson, P Hagmann, O. Cuisenaire, R. Meuli, and J. Thiran, "White matter fiber trace segmentation in DT-MRI using geometric flows," Medical Image Analysis., vol. 9, pp. 223-236, 2005. FIG. 7 shows 2D sectional contour superimposed over corresponding FA images. It is clear that the process of the present invention catches more accurate corpus callosum detail than the model that is applied in [1]. L. Jonasson, X. Bresson, P Hagmann, O. Cuisenaire, R. Meuli, and J. Thiran, "White matter fiber trace segmentation in DT-MRI using geometric flows," Medical Image Analysis., vol. 9, pp. 223-236, 2005.

Figure 8:
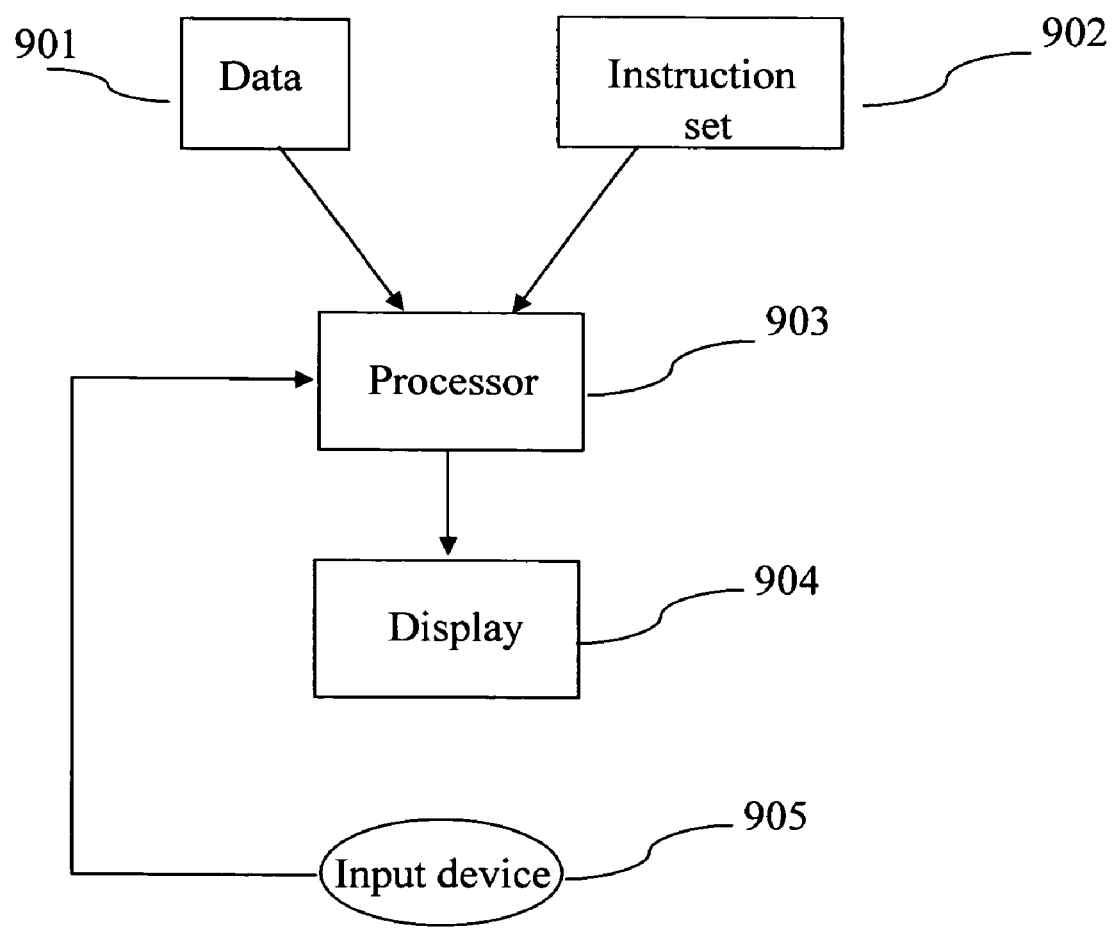
FIG. 8 is a diagram of a computer system that is used to perform the steps described herein in accordance with one aspect of the present invention.

FIG. 8 illustrates a computer system that can be used in accordance with one aspect of the present invention. The system is provided with data 901 representing the to be displayed MRI image. An instruction set or program 902 comprising the methods of the present invention is provided and combined with the data in a processor 903, which can process the instructions of 902 applied to the data 901 and show the resulting image on a display 904. The processor can be dedicated hardware, a GPU, a CPU or any other computing device that can execute the instructions of 902. An input device 905 like a mouse, or track-ball or other input device allows a user to initiate the segmentation process. Consequently the system as shown in FIG. 8 provides an interactive system for image segmentation. Of course, any type of computer system can be used, although it is preferred to use a computer system having sufficient processing power. By way of example only, a stand alone PC, a multiprocessor PC, a main frame computer, a parallel processing computer or any other type of computer can be used.

Any reference to the term pixel herein shall also be deemed a reference to a voxel.

The following references provide background information generally related to the present invention and are hereby incorporated by reference: [1] L. Jonasson, X. Bresson, P Hagmann, O. Cuisenaire, R. Meuli, and J. Thiran, "White matter fiber trace segmentation in DT-MRI using geometric flows," *Medical Image Analysis.*, vol. 9, pp. 223-236, 2005; [2] M. Lazar, D. Weinstein, and J. Tsuruda et al, "White matter tractography using diffusion tensor deflection," *Human Brain Mapping*, vol. 18, pp. 306-321, 2003.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method to segment white matter fiber tracts from MRI image data by diffusion tensor imaging wherein a surface of an object is evolved using a surface evolution velocity, comprising: a processor to perform the following steps:
   determining the surface evolution velocity as a function of a normalized tensor scalar product plus a coincidence term that measures the coincidence of a normal direction and a tensor field; and
   growing the object in accordance with the surface evolution velocity; wherein the surface evolution velocity is expressed
   as F=mean(NTSP $(D_i, D_{i+1})$, NTSP$(D_i, D_{i+2})$)+$\beta$COIN wherein:

$$NTSP(D_i, D_{i-1}) = \frac{D_i : D_{i-1}}{\text{Trace}(D_i)\text{Trace}(D_{i-1})},$$

wherein $D_i$ is the diffusion tensor;
NTSP $(D_i, D_{i-1})$ is the normalized tensor scalar product;
COIN is the coincidence factor and $\beta$ is a constant.

2. The method as claimed in claim 1, wherein the measure of coincidence COIN is expressed as $$COIN_3 = (FA) * N \cdot \frac{Di * N}{\max(\lambda_1, \lambda_2, \lambda_3)}.$$

3. The method as claimed in claim 1, wherein the measure of coincidence COIN is expressed as $$COIN_2 = (FA) * N \cdot \frac{D_i * N}{|D_i * N|}.$$

4. The method as claimed in claim 1, wherein the measure of coincidence COIN is expressed as $$COIN_1 = N \cdot PE.$$

5. The method as claimed in claim 1, wherein $\beta$=10.

6. The method as claimed in claim 1, wherein the surface evolution is terminated at locations where the similarity measure NTSP is less than a threshold or when a gradient of the measure of similarity NTSP is less than a threshold.

7. A system to process an image from image data, including:
   a processor;
   application software operable on the processor to segment white matter fiber tracts from MRI image data by diffusion tensor imaging wherein a surface of an object is evolved using a surface evolution velocity, comprising:
   determining the surface evolution velocity as a function of a normalized tensor scalar product plus a coincidence term that measures the coincidence of a normal direction and a tensor field; and
   growing the object in accordance with the surface evolution velocity; wherein the surface evolution velocity is expressed
   as F=mean(NTSP $(D_i, D_{i+1})$, NTSP $(D_i, D_{i+2})$)+$\beta$COIN wherein:

$$NTSP(D_i, D_{i-1}) = \frac{D_i : D_{i-1}}{\text{Trace}(D_i)\text{Trace}(D_{i-1})},$$

wherein $D_i$ is the diffusion tensor;
NTSP $(D_i, D_{i-1})$ is the normalized tensor scalar product;
COIN is the coincidence factor and $\beta$ is a constant.

8. The system as claimed in claim 7, wherein the measure of coincidence COIN is expressed as $$COIN_3 = (FA) * N \cdot \frac{Di * N}{\max(\lambda_1, \lambda_2, \lambda_3)}.$$

9. The system as claimed in claim 7, wherein the measure of coincidence COIN is expressed as $$COIN_2 = (FA) * N \cdot \frac{D_i * N}{|D_i * N|}.$$

10. The system as claimed in claim 7, wherein the measure of coincidence COIN is expressed as $$COIN_1 = N \cdot PE.$$

11. The system as claimed in claim 7, wherein $\beta$=10.

12. The system as claimed in claim 7, wherein the surface evolution is terminated at locations where the similarity measure NTSP is less than a threshold or when a gradient of the measure of similarity NTSP is less than a threshold.

* * * * *

UNITED STATES PATENT AND TRADEMARK OFFICE
CERTIFICATE OF CORRECTION

PATENT NO. : 7,627,155 B2  Page 1 of 1
APPLICATION NO. : 11/489103
DATED : December 1, 2009
INVENTOR(S) : Guo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Second Day of November, 2010

David J. Kappos
*Director of the United States Patent and Trademark Office*